US012327927B2

(12) United States Patent
Wu et al.

(10) Patent No.: US 12,327,927 B2
(45) Date of Patent: Jun. 10, 2025

(54) ELECTRONIC DEVICE

(71) Applicant: PEGATRON CORPORATION, Taipei (TW)

(72) Inventors: Chien-Yi Wu, Taipei (TW); Chao-Hsu Wu, Taipei (TW); Sheng-Chin Hsu, Taipei (TW); Chia-Hung Chen, Taipei (TW); Chih-Wei Liao, Taipei (TW); Hau Yuen Tan, Taipei (TW); Hao-Hsiang Yang, Taipei (TW); Shih-Keng Huang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 190 days.

(21) Appl. No.: 18/450,415

(22) Filed: Aug. 16, 2023

(65) Prior Publication Data

US 2024/0113429 A1 Apr. 4, 2024

(30) Foreign Application Priority Data

Oct. 4, 2022 (TW) ................................. 111137625

(51) Int. Cl.
*H01Q 5/307* (2015.01)
*H01Q 1/22* (2006.01)

(52) U.S. Cl.
CPC ............... *H01Q 5/307* (2015.01); *H01Q 1/22* (2013.01)

(58) Field of Classification Search
CPC ............ H01Q 1/22; H01Q 1/24; H01Q 5/307; H01Q 5/371; H01Q 5/392; H01Q 5/40; H01Q 9/42
See application file for complete search history.

(56) References Cited

U.S. PATENT DOCUMENTS

| | | | | |
|---|---|---|---|---|
| 9,484,631 B1 * | 11/2016 | Napoles | ................. | H01Q 5/378 |
| 10,069,193 B2 * | 9/2018 | Li | ............................ | H01Q 9/42 |
| 2006/0017621 A1 * | 1/2006 | Okawara | ................ | H01Q 5/364 343/702 |
| 2014/0295917 A1 * | 10/2014 | Hsu | ...................... | H01Q 9/0421 455/562.1 |
| 2018/0183139 A1 * | 6/2018 | Liu | ........................ | H01Q 1/243 |
| 2021/0159611 A1 * | 5/2021 | Wu | ........................ | H01Q 21/30 |
| 2021/0359426 A1 * | 11/2021 | Ren | .......................... | H01Q 1/48 |
| 2022/0094040 A1 | 3/2022 | Choi et al. | | |
| 2024/0145898 A1 * | 5/2024 | Wu | ........................ | H01Q 1/243 |

FOREIGN PATENT DOCUMENTS

| | | |
|---|---|---|
| TW | I624999 | 5/2018 |

* cited by examiner

*Primary Examiner* — Dameon E Levi
*Assistant Examiner* — Leah Rosenberg
(74) *Attorney, Agent, or Firm* — J.C. PATENTS

(57) ABSTRACT

An electronic device including a bracket and an antenna is provided. The bracket includes first, second, third, and fourth surfaces. The antenna includes a radiator. The radiator includes first, second, third, and fourth portions. The first portion is located on the first surface and includes connected first and second sections. The second portion is located on the second surface and includes third, fourth, fifth, and sixth sections. The third section, the fourth section, and the fifth sections are bent and connected to form a U shape. The third portion is located on the third surface and is connected to the second section and the fourth section. The fourth portion is located on the fourth surface and is connected to the fifth section, the sixth section, and the third portion. The radiator is adapted to resonate at a low frequency band and a first high frequency band.

11 Claims, 9 Drawing Sheets

ELECTRONIC DEVICE

CROSS-REFERENCE TO RELATED APPLICATION

This application claims the priority benefit of Taiwan application serial no. 111137625, filed on Oct. 4, 2022. The entirety of the above-mentioned patent application is hereby incorporated by reference herein and made a part of this specification.

BACKGROUND

Technology Field

The disclosure relates to an electronic device, and more particularly, to an electronic device including an antenna having broadband antenna characteristics.

Description of Related Art

With the development of technology, requirements for an electronic apparatus with an antenna module are getting higher and higher. In order to expand application fields of the electronic apparatus, how to achieve miniaturization of the electronic apparatus and how to enable the antenna module disposed in the electronic apparatus to have broadband antenna characteristics are the focus of current research and development.

SUMMARY

The disclosure provides an electronic device, in which a first antenna has a three-dimensional structure and good broadband antenna characteristics.

An electronic device in the disclosure includes a bracket and a first antenna. The bracket includes a first surface, a second surface, a third surface, and a fourth surface. The first surface is opposite to the fourth surface. The second surface is connected to the first surface, the third surface, and the fourth surface. The first antenna is disposed on the bracket and includes a first radiator. The first radiator includes a first portion, a second portion, a third portion, and a fourth portion. The first portion is located on the first surface and includes a first section and a second section connected to each other. The first section includes a feeding end, and the second section includes a first ground end. The second portion is located on the second surface and includes a third section, a fourth section, a fifth section, and a sixth section. The third section is connected to the first section. The third section, the fourth section, and the fifth section are bent and connected to form a U shape. The sixth section extends from the fifth section in a direction opposite to the fourth section. The third portion is located on the third surface and connected to the second section and the fourth section. The fourth portion is located on the fourth surface and connected to the fifth section, the sixth section, and the third portion. The first radiator is adapted to resonate at a low frequency band and a first high frequency band.

Based on the above, in the electronic device of the disclosure, the first radiator of the first antenna is disposed around the first surface, the second surface, the third surface, and the fourth surface of the bracket to form the three-dimensional structure. The first radiator resonates at the low frequency band and the first high frequency band through the three-dimensional structure formed by the connected first portion, second portion, third portion, and fourth portion, so that the first antenna has good broadband antenna characteristics.

DETAILED DESCRIPTION OF DISCLOSED EMBODIMENTS

Figure 1:
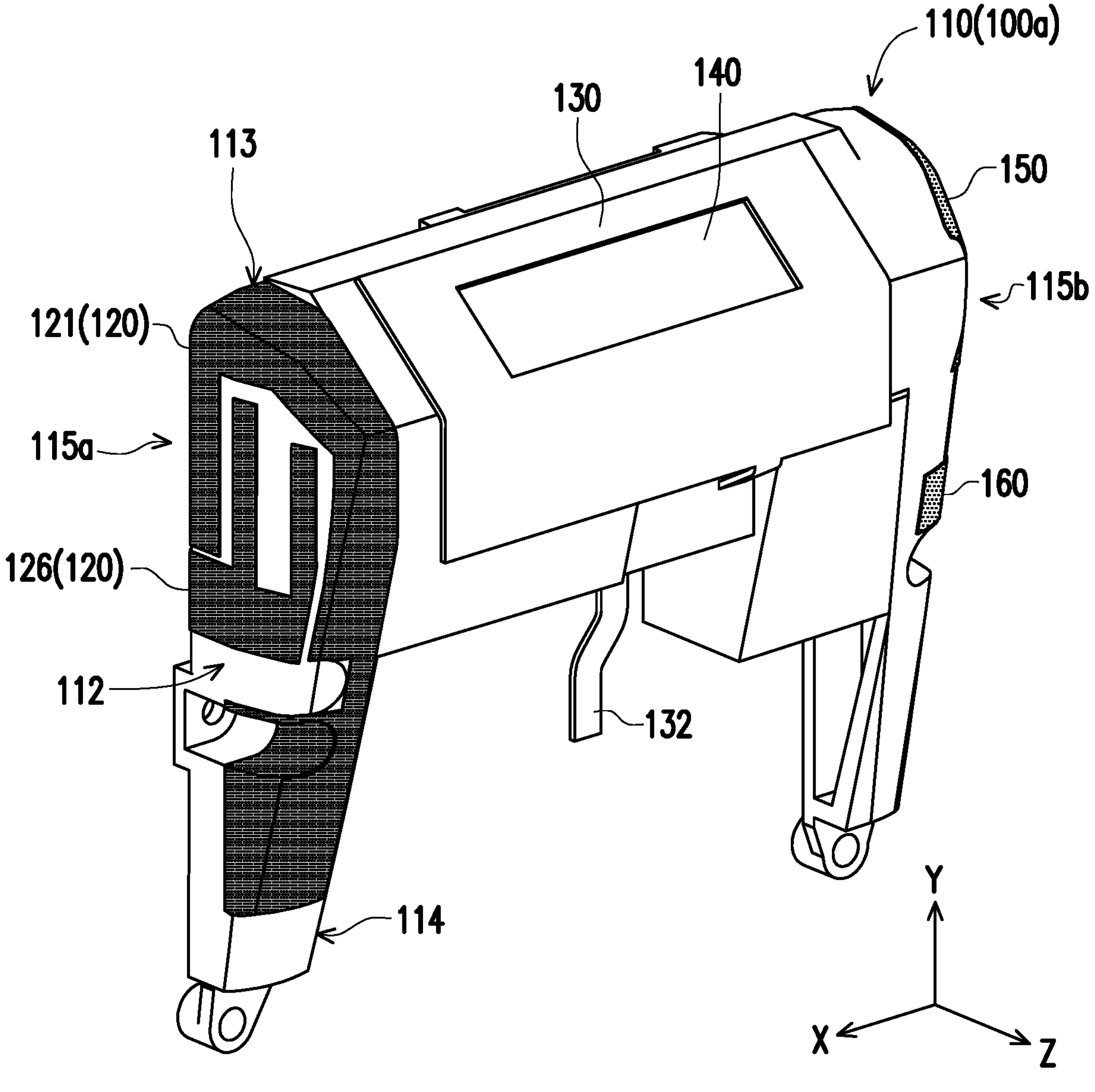
FIG. 1 is a schematic diagram of a bracket of an electronic device according to an embodiment of the disclosure.
Figure 2:
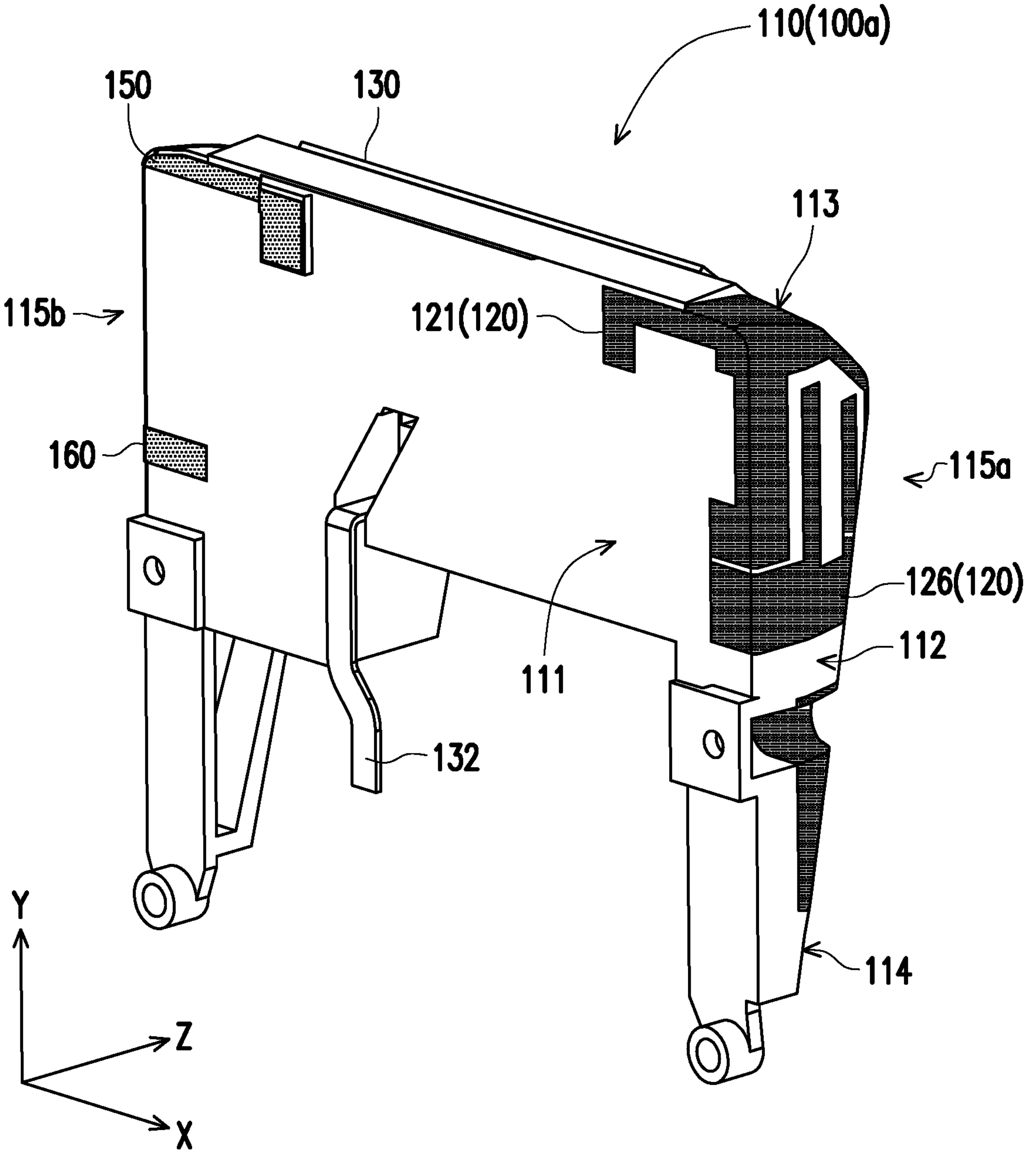
FIG. 2 is a schematic diagram of the bracket in FIG. 1 from another perspective.

FIG. 1 is a schematic diagram of a bracket of an electronic device according to an embodiment of the disclosure. FIG. 2 is a schematic diagram of the bracket in FIG. 1 from another perspective. Cartesian coordinates XYZ are provided here to facilitate description of components.

Referring to both FIGS. 1 and 2, an electronic device 100*a* includes a bracket 110 and a first antenna 120. A shape of the bracket 110 is approximately U-shaped, but the disclosure is not limited thereto. The first antenna 120 is disposed on a side arm 115*a* of the U-shaped bracket 110. The bracket 110 includes a first surface 111 (FIG. 2), a second surface 112, a third surface 113, and a fourth surface 114. The second surface 112 is connected to the first surface 111, the third surface 113, and the fourth surface 114. The first surface 111 is opposite to the fourth surface 114. The second surface 112 and the third surface 113 are located between the first surface 111 and the fourth surface 114.

The first antenna 120 is disposed on the bracket 110. The first antenna 120 includes a first radiator 121. The first radiator 121 is located on the first surface 111 (FIG. 2), the second surface 112, the third surface 113, and the fourth surface 114 of the bracket 110 around the side arm 115*a*.

Figure 3:
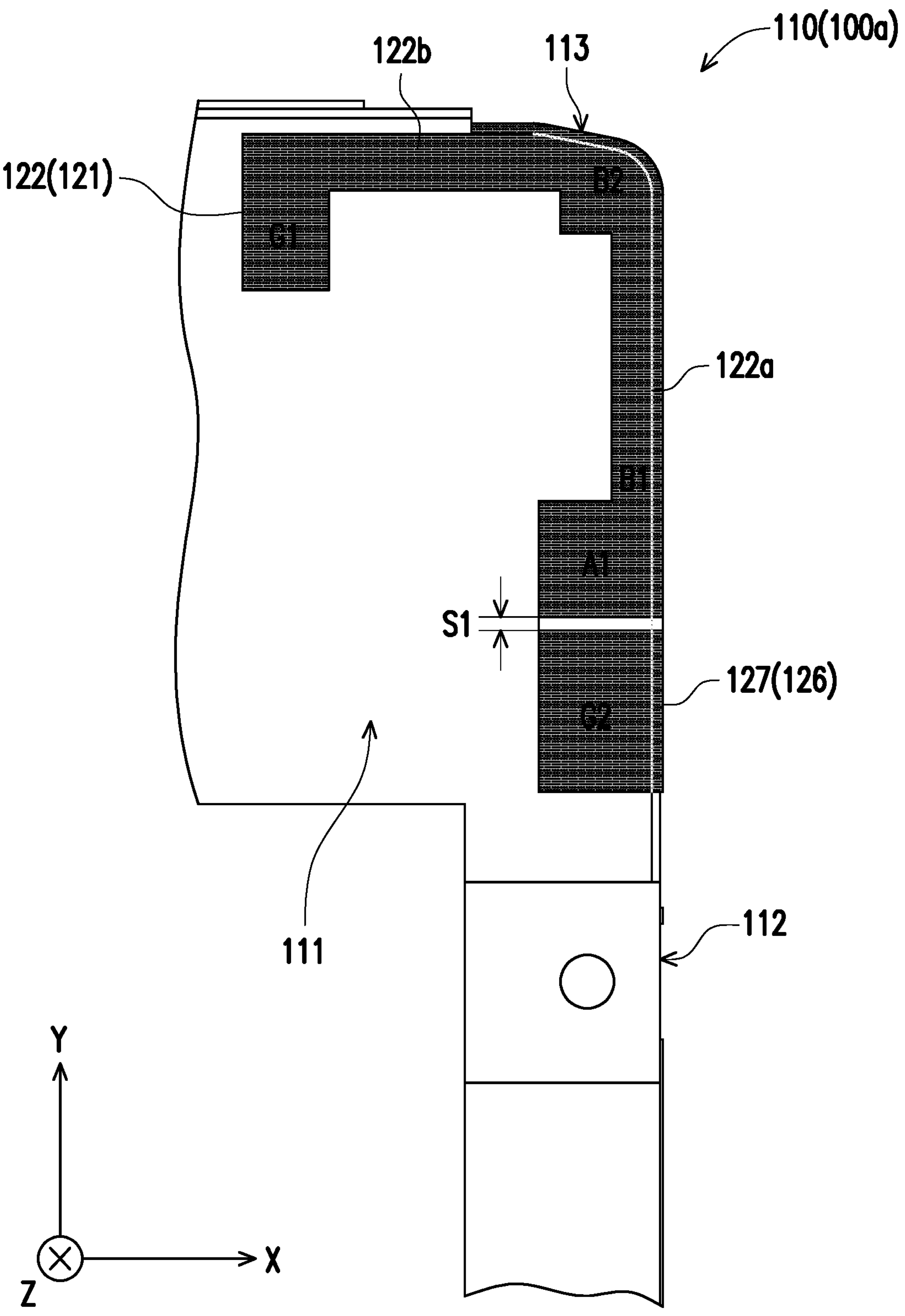
FIG. 3 is a schematic partial diagram of a first surface of the bracket in FIG. 2.
Figure 4:
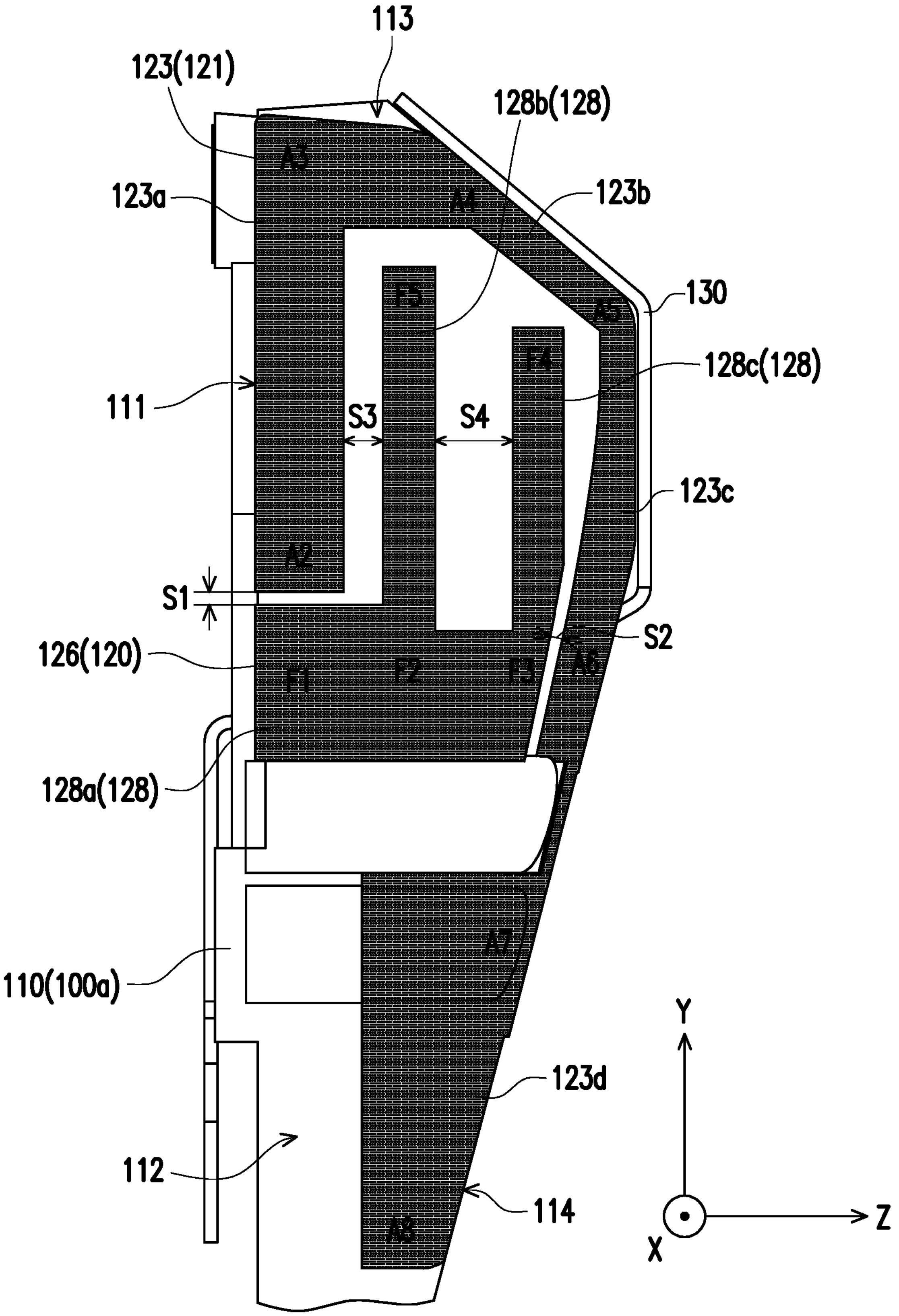
FIG. 4 is a schematic partial diagram of a second surface of the bracket in FIG. 1.
Figure 5:
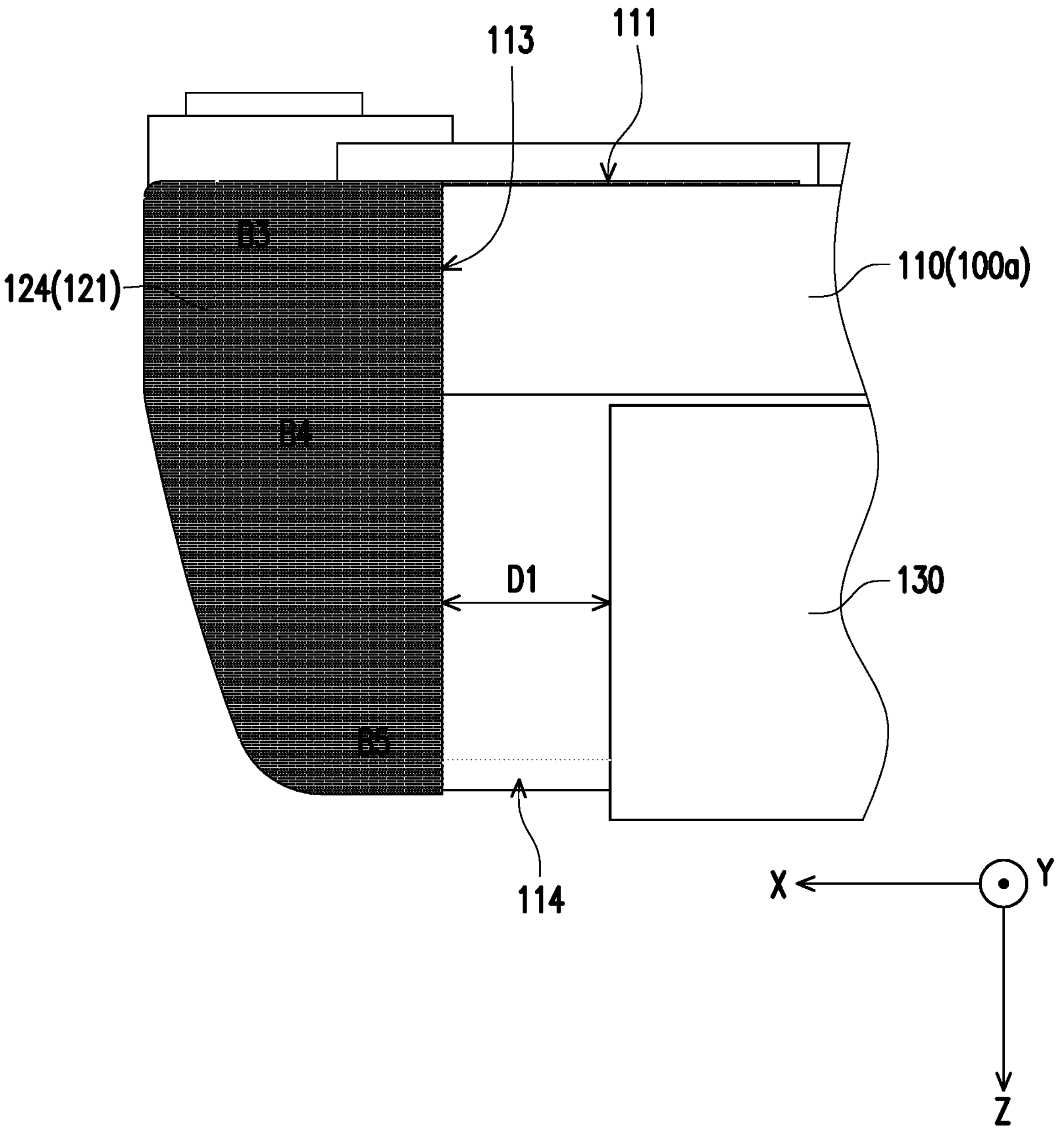
FIG. 5 is a schematic partial diagram of a third surface of the bracket in FIG. 1.
Figure 6:
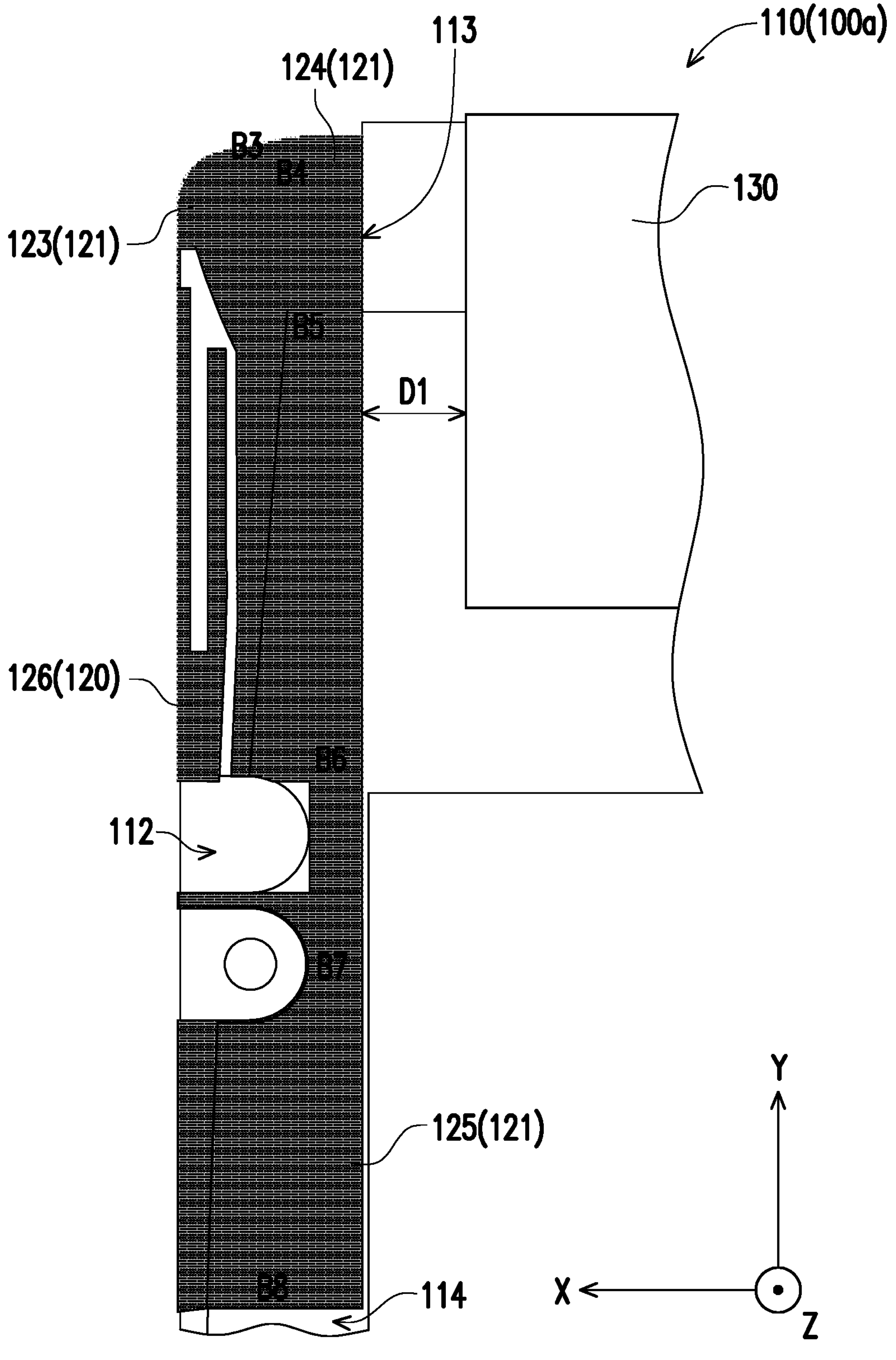
FIG. 6 is a schematic partial diagram of a fourth surface of the bracket in FIG. 1.

FIG. 3 is a schematic partial diagram of a first surface of the bracket in FIG. 2. FIG. 4 is a schematic partial diagram of a second surface of the bracket in FIG. 1. FIG. 5 is a schematic partial diagram of a third surface of the bracket in FIG. 1. FIG. 6 is a schematic partial diagram of a fourth surface of the bracket in FIG. 1. Referring to FIGS. 3 to 6 together, the first radiator 121 includes a first portion 122, a second portion 123 (FIG. 4), a third portion 124 (FIG. 5), and a fourth portion 125 (FIG. 6).

As shown in FIG. 3, the first portion 122 (positions A1, B1, B2 and G1) is located on the first surface 111, and includes a first section 122*a* (from the position A1, B1, to B2) and a second section 122*b* (from the position B2 to G1)

connected to each other. The first section 122*a* includes a feeding end (the position A1), and the second section 122*b* includes a first ground end (the position G1).

The first section 122*a* extends from the position A1 to the third surface 113 (a +Y-axis direction). The second section 122*b* extends from the position B2 away from the second surface 112 (along the −X axis). The first portion 122 is approximately L-shaped.

As shown in FIG. 4, the second portion 123 (from position A2 to A8) is located on the second surface 112, and includes a third section 123*a* (from the position A2 to A3), a fourth section 123*b* (from the position A3 to A5), and a fifth section 123*c* (from the position A5 to A6), and a sixth section 123*d* (from the position A7 to A8) connected to one another. The third section 123*a* is connected to the first section 122*a* in FIG. 3.

The third section 123*a* extends from the position A2 to the third surface 113 (along the +Y-axis). The fourth section 123*b* extends along edges of the second surface 112 and the third surface 113. The fifth section 123*c* and the sixth section 123*d* extend along the edge of the second surface 112 and an edge of the fourth surface 114. The sixth section 123*d* extends from the fifth section 123*c* in a direction (the −Y-axis) opposite to a direction of the fourth section 123*b*. The third section 123*a*, the fourth section 123*b*, and the fifth section 123*c* are bent and connected to form a U shape, and an opening of the U shape faces the −Y-axis direction.

As shown in FIG. 5, the third portion 124 (from position B3 to B5) is located on the third surface 113, and is connected to the second section 122*b* on the first surface 111 (FIG. 3) and the fourth section 123*b* on the second surface 112 (FIG. 4).

As shown in FIG. 6, the fourth portion 125 (from position B5 to B8) is located on the fourth surface 114, and is connected to the fifth section 123*c* and the sixth section 123*d* on the second surface 112 and the third portion 124 (FIG. 4).

Here, the first radiator 121 of the first antenna 120 is connected to the first ground end (the position G1 in FIG. 3) through the first portion 122, the second portion 123 in FIG. 4, the third portion 124 and the fourth portion 125 in FIG. 6 from the feeding end in FIG. 3. In this way, the first radiator 121 may form a planar inverted-F antenna (PIFA) antenna structure, so that the first radiator 121 may resonate at a low frequency band and a first high frequency band. The low frequency band is between 698 MHz and 1050 MHz, and the first high frequency band is between 2500 MHz and 6000 MHz.

As shown in FIGS. 3 and 4, the first antenna 120 further includes a second radiator 126. The second radiator 126 is located on the first surface 111 and the second surface 112 of the bracket 110. In detail, the second radiator 126 (from position G2 to F1, F2, F3, F4 and F5) includes a fifth portion 127 (the position G2) located on the first surface 111 (FIG. 3) and a sixth portion 128 (including the positions F1, F2, F3, F4 and F5) located on the second surface 112 (FIG. 4). The fifth portion 127 includes a second ground end (the position G2) and is close to the position A1. The sixth portion 128 includes a seventh section 128*a* (from the position F1 to F3). The seventh section 128*a* is close to the opening of the U shape of the second portion 123, and extends from the fifth portion 127 to a direction of the fourth surface 114 (along the +Z-axis).

As shown in FIGS. 3 and 4, there is a first slot S1 formed between the first section 122*a* of the first portion 122 of the first radiator 121 and the fifth portion 127 of the second radiator 126. Specifically, the first slot S1 is located between the position A1 and the position G2 (FIG. 3). In addition, the first slot S1 is further located between the position A2 of the third section 123*a* and the position F1 of the seventh section 128*a* (FIG. 4).

There is a second slot S2 formed between the fifth section 123*c* of the first radiator 121 and the seventh section 128*a* of the sixth portion 128 of the second radiator 126. Specifically, the second slot S2 is located between the position A6 and the position F3. A width of the first slot S1 and the second slot S2 is between 0.3 mm and 1 mm.

As shown in FIGS. 3 and 4, the second radiator 126 is connected to the seventh section 128*a* of the sixth portion 128 through the second ground end (the position G2 in FIG. 3) of the fifth portion 127, and is combined with the feeding end (the position A1) to the third section 123*a*, the fourth section 123*b*, and the fifth section 123*c* to form an open-loop antenna structure.

In this way, the first radiator 121 and the fifth portion 127 and the seventh section 128*a* of the sixth portion 128 of the second radiator 126 jointly resonate at the low frequency band and a second high frequency band. A bandwidth of the second high frequency band is greater than a bandwidth of the first high frequency band (2500 MHz to 6000 MHz). The second high frequency band is between 2200 MHz and 6000 MHz.

As shown in FIG. 4, the sixth portion 128 of the second radiator 126 further includes an eighth section 128*b* (the positions F2 and F5) and a nineth section 128*c* (the position F3 and F4) located on the second surface 112 and extending from the seventh section 128*a* to the fourth section 123*b* (the +Y-axis direction). The eighth section 128*b* and the nineth section 128*c* are parallel to the third section 123*a*. The eighth section 128*b* and the nineth section 128*c* are located in the opening of the U shape of the second portion 123.

The eighth section 128*b* is located between the nineth section 128*c* and the third section 123*a*. There is a third slot S3 formed between the third section 123*a* and the eighth section 128*b*. There is a fourth slot S4 formed between the eighth section 128*b* and the nineth section 128*c*. A width of the third slot S3 is between 0.5 mm and 1.5 mm, and a width of the fourth slot S4 is between 1.5 mm and 2.5 mm. The width of the fourth slot S4 is greater than the width of the third slot S3.

The second radiator 126 increases the high frequency band of the first antenna 120 by connecting the eighth section 128*b* and the ninth section 128*c* in series respectively and through the first slot S1, the second slot S2, the third slot S3, and the fourth slot S4. The first radiator 121 and the second radiator 126 jointly resonate at the low frequency band and a third high frequency band. A bandwidth of the third high frequency band is greater than the bandwidth of the second high frequency band (2200 MHz to 6000 MHz). The third high frequency band is between 1710 MHz and 6000 MHz.

In this way, the first antenna 120 forms an F-shaped slot-coupled broadband antenna architecture with a bandwidth of 5G Sub-6. The first antenna 120 resonates at the high frequency bands between 1710 MHz and 6000 MHz and the low frequency bands between 698 MHz and 1050 MHz. A user may adjust a frequency bandwidth of the first antenna 120 by adjusting sizes of the first slot S1, the second slot S2, the third slot S3, and the fourth slot S4.

Figure 7:
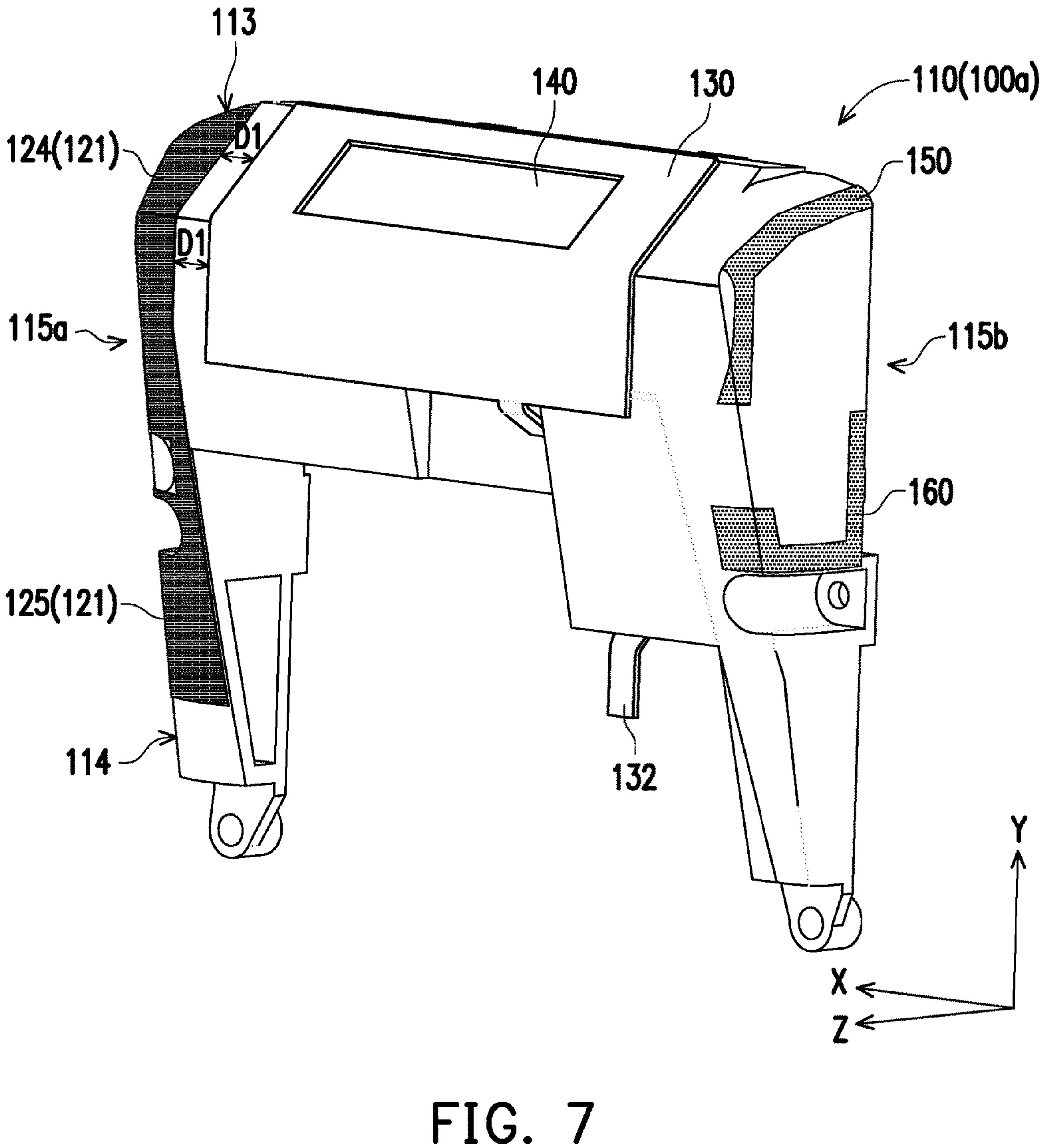
FIG. 7 is a schematic diagram of the bracket in FIG. 1 from another perspective.

FIG. 7 is a schematic diagram of the bracket in FIG. 1 from another perspective. Referring to FIG. 7, the electronic device 100*a* further includes a second antenna 130, a third antenna 150, a fourth antenna 160, and a two-dimensional barcode scanning module 140. The second antenna 130 is disposed on at least one of the third surface 113 and the fourth surface 114 of the bracket 110. There is a distance D1 between at least one of the third portion 124 and the fourth portion 125 of the first radiator 121 of the first antenna 120 and the second antenna 130, so that the first antenna 120 and the second antenna 130 have great isolation without interfering with each other. The distance D1 is greater than or equal to 4 mm and less than 6 mm, but the disclosure is not limited thereto.

The second antenna 130 is located on the third surface 113 and the fourth surface 114 of the bracket 110 and surrounds the two-dimensional barcode scanning module 140. The distance D1 between the second antenna 130 and the third portion 124 and the fourth portion 125 of the first radiator 121 of the first antenna 120 is 4 mm. The third antenna 150 and the fourth antenna 160 are disposed on another side arm 115*b* of the bracket 110.

The second antenna 130 is, for example, a near field communication (NFC) antenna. The third antenna 150 is, for example, a global positioning system (GPS) antenna. The fourth antenna 160 is, for example, a Bluetooth and Wi-Fi antenna. However, the disclosure is not limited thereto. The third antenna 150 and the fourth antenna 160 are disposed on the bracket 110 and extend from positions shown in FIG. 7 to the first surface 111 (FIG. 2) of the bracket 110. A connection wire 132 of the second antenna 130 is exposed from the first surface 111 of the bracket 110. In this embodiment, the first antenna 120 and the second antenna 130 resonate at different frequency bands, but the disclosure is not limited thereto.

The electronic device 100*a* in this embodiment may be used in a military standard handheld communication device, but the disclosure is not limited thereto. An overall structure of the bracket 110 (FIG. 1) has a length (in the X-axis direction) of 64 mm, a width (in the Y-axis direction) of 58.7 mm, and a thickness (in the Z-axis direction) of 15 mm.

Figure 8:
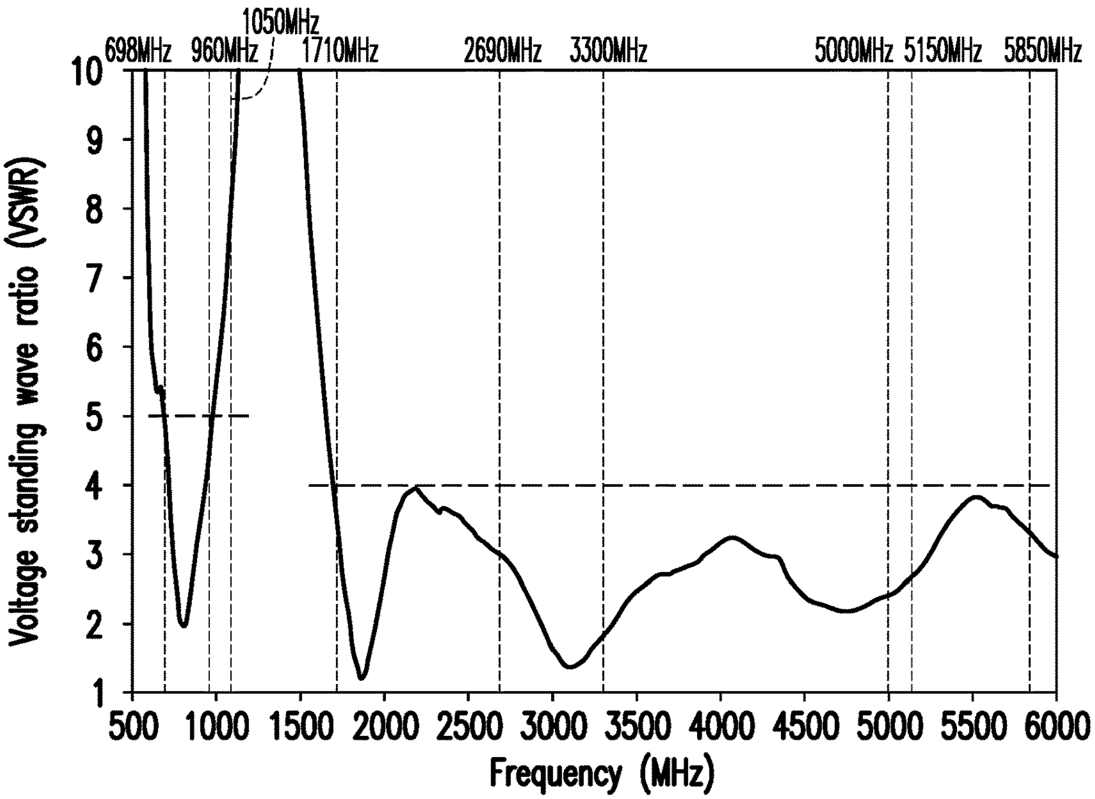
FIG. 8 is a plot diagram of frequency vs. voltage standing wave ratio of a first antenna in FIG. 1.

FIG. 8 is a plot diagram of frequency vs. voltage standing wave ratio of a first antenna in FIG. 1. Referring to FIG. 8, a value of a voltage standing wave ratio (VSWR) of the first antenna 120 (FIG. 1) is less than 5 in a low frequency band of 698 MHz to 960 MHz. The value of the voltage standing wave ratio of the first antenna 120 is less than 4 when the first antenna 120 is in ranges of a first interval (1710 MHz to 2690 MHz), second interval (3300 MHz to 5000 MHz), and third interval (5150 MHz to 5850 MHz) of a high frequency. As a result, the first antenna 120 in this embodiment has good antenna characteristics.

Figure 9:
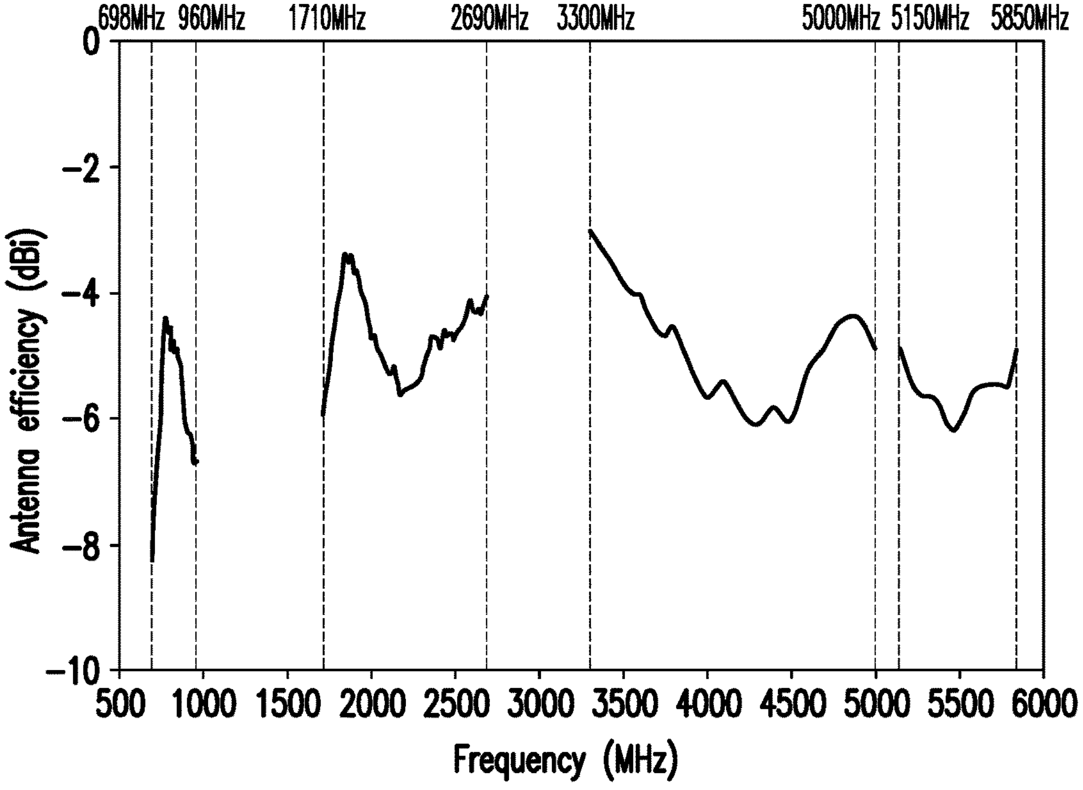
FIG. 9 is a plot diagram of frequency vs. antenna efficiency of the first antenna in FIG. 1.

FIG. 9 is a plot diagram of frequency vs. antenna efficiency of the first antenna in FIG. 1. Referring to FIG. 9, in low frequency range of 698 MHz to 960 MHz, a value of antenna efficiency of the first antenna 120 is between −4.4 dBi to −8.2 dBi. In the range of the first interval of 1710 MHz to 2690 MHz of the high frequency, the value of antenna efficiency of the first antenna 120 is between −3.4 dBi to −6.0 dBi. In the range of the second interval of 3300 MHz to 5000 MHz of the high frequency, the value of antenna efficiency of the first antenna 120 is between −3.0 dBi to −6.1 dBi. In the range of the third interval of 5150 MHz to 5850 MHz of the high frequency, the value of antenna efficiency of the first antenna 120 is between −4.9 dBi to −6.2 dBi. As a result, the first antenna 120 has good antenna efficiency in the above frequency ranges.

Figure 10:
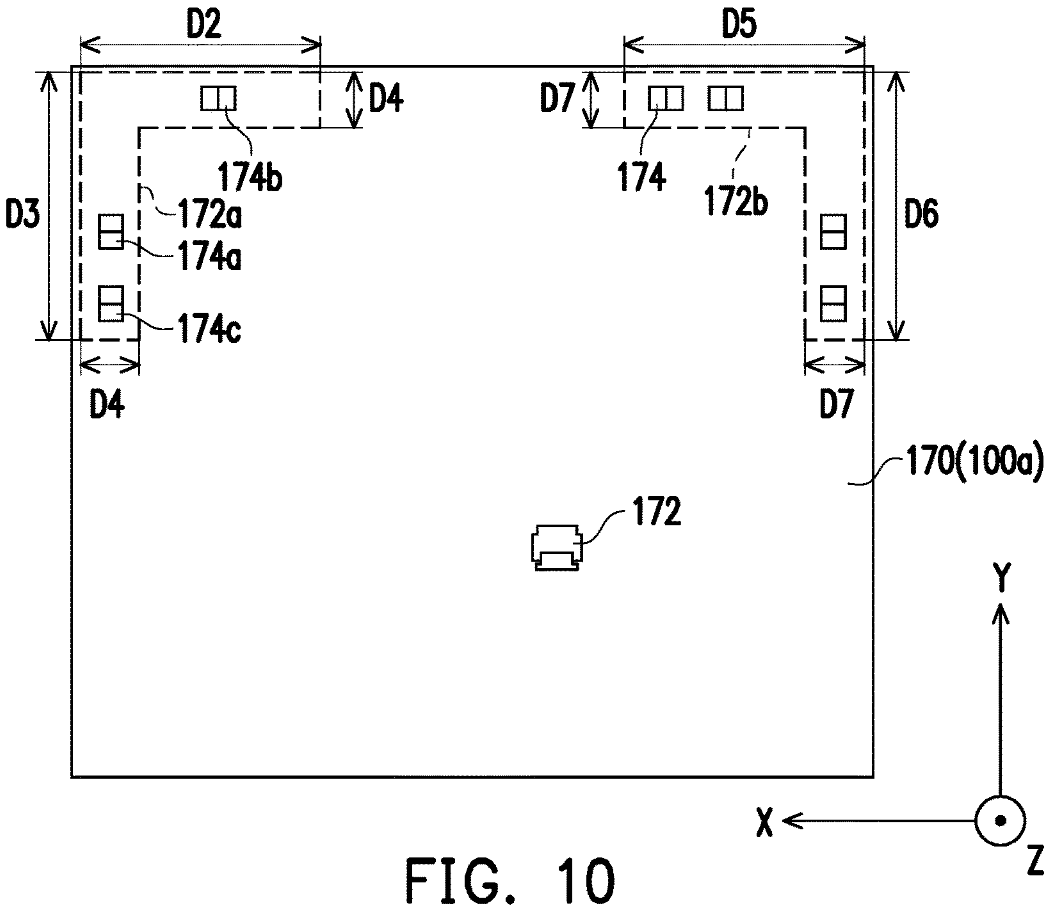
FIG. 10 is a schematic diagram of a main plate of the electronic device in FIG. 1.

FIG. 10 is a schematic diagram of a main plate of the electronic device in FIG. 1. Referring to FIG. 10, the electronic device 100*a* further includes a main plate 170, and the bracket 110 (FIG. 1) may be disposed on the main plate 170. The main plate 170 includes multiple clearance areas 172*a* and 172*b*, multiple elastic pieces 174, 174*a*, 174*b*, and 174*c*, and a connector 172.

Shapes and positions of the clearance areas 172*a* and 172*b* correspond to shapes and positions of the first antenna 120, the third antenna 150 and the fourth antenna 160 on the first surface 111 of the bracket 110 (FIG. 2). The elastic pieces 174, 174*a*, 174*b*, and 174*c* are disposed in the clearance areas 172*a* and 172*b*. The main plate 170 may be electrically connected to the first antenna 120, the third antenna 150, and the fourth antenna 160 through the elastic pieces 174, 174*a*, 174*b*, and 174*c*. The connector 172 may be connected to the connection wire 132 of the second antenna 130 (FIG. 2).

Specifically, the shape of the clearance area 172*a* corresponds to a shape of the first portion 122 of the first antenna 120 (FIG. 3), and is L-shaped. An overall length D2 (in the X-axis direction) of the clearance area 172*a* is 15.4 mm, an overall width D3 (in the Y-axis direction) is 25 mm, and an inner width D4 of the clearance area 172*a* is 5 mm. The elastic piece 174*a* is connected to the feeding end (the position A1) in FIG. 3. The elastic piece 174*b* is connected to the first ground end (the position G1). The elastic piece 174*c* is connected to the second ground end (the position G2).

The shape of the clearance area 172*b* corresponds to the shapes of the third antenna 150 and the fourth antenna 160 on the first surface 111 (FIG. 2), and is L-shaped. An overall length D5 (in the X-axis direction) of the clearance area 172*b* is 19 mm, an overall width D6 (in the Y-axis direction) is 24.5 mm, and an inner width D7 of the clearance area 172*b* is 5 mm.

Figure 11:
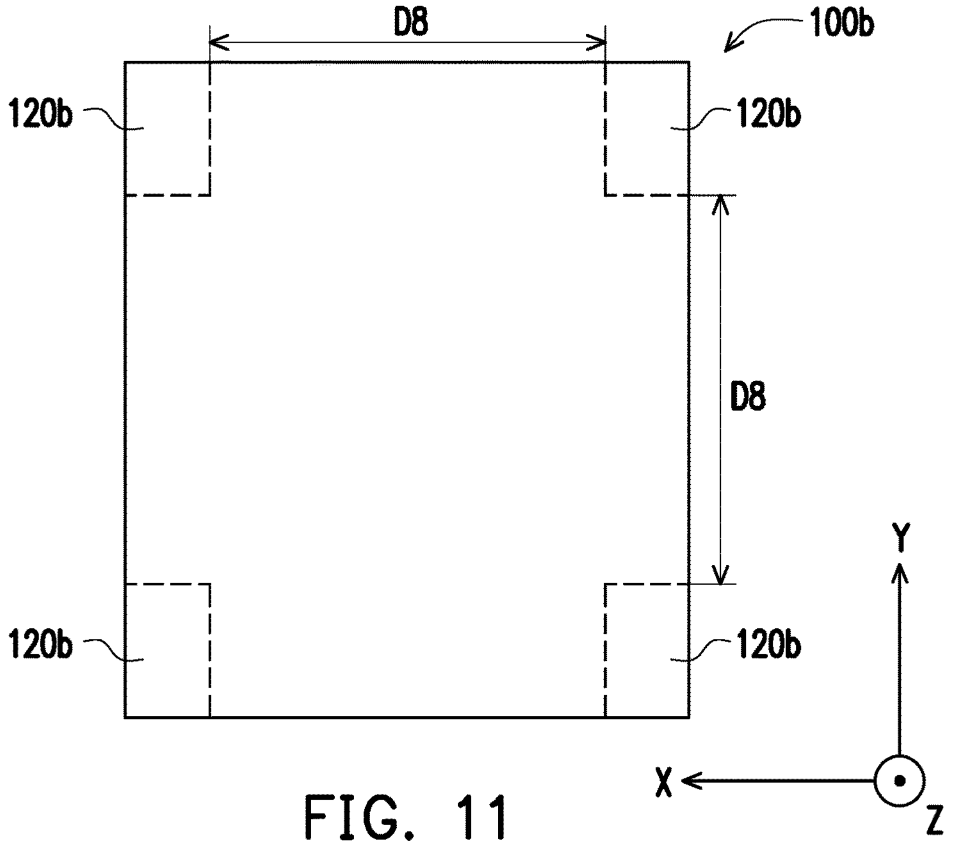
FIG. 11 is a schematic diagram of an electronic device according to another embodiment of the disclosure.

FIG. 11 is a schematic diagram of an electronic device according to another embodiment of the disclosure. Referring to FIG. 11, an electronic device 100*b* in this embodiment may be provided with multiple first antennas 120*b*, so that the electronic device 100*b* may have a multi-input multi-output (MIMO) multi-antenna configuration. Here, the electronic device 100*b* includes four first antennas 120*b* disposed at four corners of the electronic device 100*b*, and a distance D8 between the two adjacent first antennas 120*b* is greater than or equal to 150 mm.

Based on the above, in the electronic device of the disclosure, the first radiator of the first antenna is disposed in accordance with the shape of the bracket to form a three-dimensional structure, and the first radiator surrounds the first surface, the second surface, the third surface, and the fourth surface of the bracket. The first radiator resonates at the low frequency band and the high frequency band through the three-dimensional structure formed by the connected first portion, second portion, third portion, and fourth portion, so that the first antenna has good broadband antenna characteristics. The low frequency band excited by the first radiator of the first antenna is between 698 MHz and 1050 MHz, and the first high frequency band is between 2500 MHz and 6000 MHz.

The first antenna further includes the second radiator, and the second radiator includes the fifth portion (including the second ground end) disposed on the first surface of the bracket and the sixth portion disposed on the second surface. The sixth portion extends into the U-shaped opening of the second portion of the first radiator. The first antenna expands the bandwidth of the high frequency band through the second radiator, so that the third high frequency band excited by the first antenna is between 1710 MHz and 6000 MHz. The electronic device further includes the second antenna, the third antenna, the fourth antenna, and the two-dimensional barcode scanning module disposed on the bracket, so that the antennas and the two-dimensional barcode scanning modules may be integrated into the electronic device.

What is claimed is:

1. An electronic device, comprising:

a bracket comprising a first surface, a second surface, a third surface and a fourth surface, wherein the first surface is opposite to the fourth surface, and the second surface is connected to the first surface, the third surface, and the fourth surface; and a first antenna disposed on the bracket and comprising:

a first radiator, comprising:

a first portion located on the first surface and comprising a first section and a second section connected to each other, wherein the first section comprises a feeding end, and the second section comprises a first ground end;

a second portion located on the second surface and comprising a third section, a fourth section, a fifth section and a sixth section, wherein the third section is connected to the first section, the third section, the fourth section and the fifth section are bent and connected to form a U shape, and the sixth section extends from the fifth section in a direction opposite to the fourth section;

a third portion located on the third surface and connected to the second section and the fourth section; and a fourth portion located on the fourth surface and connected to the fifth section, the sixth section, and the third portion, wherein the first radiator is adapted to resonate at a low frequency band and a first high frequency band.

2. The electronic device according to claim 1, wherein the low frequency band is between 698 MHz and 1050 MHz, and the first high frequency band is between 2500 MHz and 6000 MHz.

3. The electronic device according to claim 1, wherein the first antenna further comprises a second radiator, the second radiator comprises a fifth portion on the first surface and a sixth portion on the second surface, the fifth portion comprises a second ground end, the sixth portion comprises a seventh section, and the seventh section is located at an opening of the U shape.

4. The electronic device according to claim 3, wherein the first radiator and the second radiator jointly resonate at the low frequency band and a second high frequency band, wherein a bandwidth of the second high frequency band is greater than a bandwidth of the first high frequency band.

5. The electronic device according to claim 3, wherein a first slot is formed between the first section of the first portion and the fifth portion.

6. The electronic device according to claim 3, wherein a second slot is formed between the fifth section of the second portion and the seventh section of the sixth portion.

7. The electronic device according to claim 3, wherein the sixth portion of the second radiator further comprises an eighth section and a nineth section extending from the seventh section to the fourth section, and the eighth section and the nineth section are located in the opening of the U shape.

8. The electronic device according to claim 7, wherein a third slot is formed between the third section and the eighth section, a fourth slot is formed between the eighth section and the nineth section, and a width of the fourth slot is greater than a width of the third slot.

9. The electronic device according to claim 8, wherein the first radiator and the second radiator jointly resonate at the low frequency band and a third high frequency band, wherein a bandwidth of the third high frequency band is greater than a bandwidth of a second high frequency band.

10. The electronic device according to claim 1, further comprising a second antenna disposed on at least one of the third surface and the fourth surface of the bracket, wherein the first antenna and the second antenna resonate at different frequency bands, and a distance between the first antenna and the second antenna is greater than or equal to 4 mm.

11. The electronic device according to claim 1, further comprising another first antenna disposed on the bracket, wherein a distance between the first antenna and the another first antenna is greater than or equal to 150 mm.

* * * * *